(12) United States Patent
Mitsui

(10) Patent No.: US 12,326,168 B2
(45) Date of Patent: Jun. 10, 2025

(54) OPENING AND CLOSING MECHANISM

(71) Applicant: MITSUBISHI STEEL MFG. CO., LTD., Tokyo (JP)

(72) Inventor: Yasuhiro Mitsui, Chiba (JP)

(73) Assignee: MITSUBISHI STEEL MFG. CO., LTD., Tokyo (JP)

( * ) Notice: Subject to any disclaimer, the term of this patent is extended or adjusted under 35 U.S.C. 154(b) by 0 days.

(21) Appl. No.: 18/249,330

(22) PCT Filed: Dec. 5, 2022

(86) PCT No.: PCT/JP2022/044691
§ 371 (c)(1),
(2) Date: Jun. 22, 2023

(87) PCT Pub. No.: WO2023/112737
PCT Pub. Date: Jun. 22, 2023

(65) Prior Publication Data
US 2024/0026920 A1 Jan. 25, 2024

(30) Foreign Application Priority Data
Dec. 15, 2021 (JP) .................. 2021-203131

(51) Int. Cl.
*F16C 11/04* (2006.01)
*B60R 11/02* (2006.01)

(52) U.S. Cl.
CPC ........... *F16C 11/04* (2013.01); *B60R 11/0235* (2013.01)

(58) Field of Classification Search
CPC .. F16C 11/04; B60R 11/0235; E05D 11/1078; E05D 2011/085; E05D 11/082; E05D 11/084
See application file for complete search history.

(56) References Cited

U.S. PATENT DOCUMENTS 2,922,669 A * 1/1960 Hansen .................. F16B 43/00
16/334
6,125,509 A * 10/2000 Hartigan ............... G06F 1/1681
16/337
(Continued)

FOREIGN PATENT DOCUMENTS

CN 202690736 U 1/2013
CN 107237816 10/2017
(Continued)

OTHER PUBLICATIONS

International Search Report for PCT/JP2022/044691 mailed on Jan. 24, 2023.
(Continued)

*Primary Examiner* — Jason W San
*Assistant Examiner* — Matthew J Sullivan
(74) *Attorney, Agent, or Firm* — IPUSA, PLLC

(57) ABSTRACT

An opening/closing mechanism includes: opening/closing member including rotating portion on rotation axis; and cam member to face the rotating portion of the opening/closing member on the rotation axis and to apply a load to rotation of the rotating portion. One of the cam member and the rotating portion includes: at least one first-cam-projection provided on first circumference having the rotation axis as center; and at least one second-cam-projection provided on second circumference having the rotation axis as center, with the second circumference being larger in radius than the first circumference. The other member includes sliding face over which the first and second cam projections slide. The opening/closing mechanism has: first-angle-range in which the first-cam-projection slides over the sliding face and the second-cam-projection does not slide over the sliding face; and second-angle-range in which the second-cam-projection (Continued)

slides over the sliding face and the first-cam-projection does not slide over the sliding face.

18 Claims, 13 Drawing Sheets

(56) References Cited

U.S. PATENT DOCUMENTS

| | | | | |
|---|---|---|---|---|
| 6,532,627 | B2* | 3/2003 | Audisio | E05D 11/1085 16/322 |
| 6,637,715 | B2* | 10/2003 | Hoek | B60R 1/076 248/478 |
| 6,666,422 | B1* | 12/2003 | Lu | G06F 1/1616 248/922 |
| 7,488,136 | B2* | 2/2009 | Chen | F16M 11/10 403/96 |
| 7,530,541 | B2* | 5/2009 | Wang | F16M 11/10 248/921 |
| 7,536,749 | B2* | 5/2009 | Lu | G06F 1/1681 16/340 |
| 7,631,398 | B1* | 12/2009 | Lin | G06F 1/1681 16/303 |
| 7,644,473 | B2* | 1/2010 | Chen | G06F 1/1601 16/340 |
| 7,856,695 | B2* | 12/2010 | Tang | F16M 11/10 16/340 |
| 7,992,255 | B2* | 8/2011 | Chang | H04M 1/0216 16/337 |
| 8,176,987 | B2* | 5/2012 | Rekeny | F16F 1/025 169/57 |
| 8,634,548 | B2* | 1/2014 | Jung | H04M 1/0216 361/679.28 |
| 8,763,969 | B2* | 7/2014 | Wu | F16M 11/10 248/162.1 |
| 8,893,353 | B2* | 11/2014 | Shih | G06F 1/1681 16/303 |
| 9,428,947 | B2* | 8/2016 | Nagami | F16M 13/02 |
| 9,617,770 | B1* | 4/2017 | Lin | E05D 11/082 |
| 9,687,076 | B2* | 6/2017 | Su | G06F 1/1626 |
| 11,409,130 | B1* | 8/2022 | Jeong | G02B 27/0176 |
| 11,415,200 | B2* | 8/2022 | Hsiao | G06F 1/1681 |
| 2004/0052058 | A1 | 3/2004 | Minami et al. | |
| 2007/0163081 | A1* | 7/2007 | Lu | F16M 11/10 16/330 |
| 2008/0196204 | A1* | 8/2008 | Lin | F16M 13/027 16/341 |
| 2008/0229546 | A1* | 9/2008 | Chung | G06F 1/1681 16/380 |
| 2008/0256748 | A1* | 10/2008 | Saito | F16M 13/027 16/321 |
| 2010/0000370 | A1 | 1/2010 | Chang | |
| 2011/0062304 | A1* | 3/2011 | Hsieh | F16M 13/00 248/372.1 |
| 2014/0047672 | A1 | 2/2014 | Saito et al. | |

FOREIGN PATENT DOCUMENTS

| | | | | |
|---|---|---|---|---|
| JP | 2007-107592 | | 4/2007 | |
| JP | 3153622 U | | 9/2009 | |
| JP | 2009-257428 | | 11/2009 | |
| JP | 2010190431 A | * | 9/2010 | E05D 11/1042 |
| JP | 3165784 U | | 2/2011 | |
| JP | 2011-153685 | | 8/2011 | |
| JP | 2012-248761 | | 12/2012 | |
| JP | 2016-037979 | | 3/2016 | |
| JP | 2019-199928 | | 11/2019 | |
| KR | 100746966 B1 | * | 8/2007 | |
| TW | M370286 U | | 12/2009 | |
| WO | WO-2006129911 A1 | * | 12/2006 | G06F 1/1616 |
| WO | WO-2012033056 A1 | * | 3/2012 | G06F 1/1681 |
| WO | 2012/111634 | | 8/2012 | |

OTHER PUBLICATIONS

The Decision to Grant a Patent for JP2021-203131 mailed on Aug. 16, 2022.
Taiwanese Office Action for 111147181 mailed on Jan. 9, 2023.
Notice of Allowance for 111147181 mailed on Mar. 7, 2023.
Office Action mailed on Apr. 8, 2024 with respect to the corresponding patent application No. 202280007426.2.
Office Action mailed on Nov. 27, 2024 with respect to the corresponding Chinese patent application No. 202280007426.2.

* cited by examiner

OPENING AND CLOSING MECHANISM

TECHNICAL FIELD

The present invention relates to an opening and closing mechanism.

BACKGROUND ART

PTL 1 below relates to a hinge device, and discloses a technique that is capable of changing friction torque in accordance with a rotation angle of a bracket by providing a convex portion in the surface of a cam member and a concave portion in the surface of a bracket.

CITATION LIST

Patent Literature

[PTL 1] International Publication No. WO2012/111634

SUMMARY OF INVENTION

Technical Problem

However, in the conventional technique, two members that slide over each other always slide over the same portions thereof at any rotation angle. Thus, since the sliding portion is worn at a relatively early stage, there is a risk that sliding torque decreases and rattling occurs.

In order to solve the above-described problem, the present invention has an object to provide an opening and closing mechanism that is capable of increasing wear resistance of a sliding portion.

Solution to Problem

In order to solve the above-described problem, an opening and closing mechanism according to one embodiment includes: an opening and closing member including a rotating portion on a rotation axis thereof; and a cam member disposed to face the rotating portion of the opening and closing member on the rotation axis, the cam member being configured to apply a load to rotation of the rotating portion. One of the cam member and the rotating portion includes: at least one first cam projection provided on a first circumference having the rotation axis as a center thereof; and at least one second cam projection provided on a second circumference having the rotation axis as a center thereof, with a radius of the second circumference being larger than a radius of the first circumference. The other member of the cam member and the rotating portion includes a sliding face over which the first cam projection and the second cam projection slide. The opening and closing mechanism has: a first angle range in which the first cam projection slides over the sliding face and the second cam projection does not slide over the sliding face; and a second angle range in which the second cam projection slides over the sliding face and the first cam projection does not slide over the sliding face.

Advantageous Effects of Invention

According to the opening and closing mechanism according to one embodiment, it is possible to provide an opening and closing mechanism that is capable of increasing wear resistance of a sliding portion.

DESCRIPTION OF EMBODIMENTS

Figure 1:
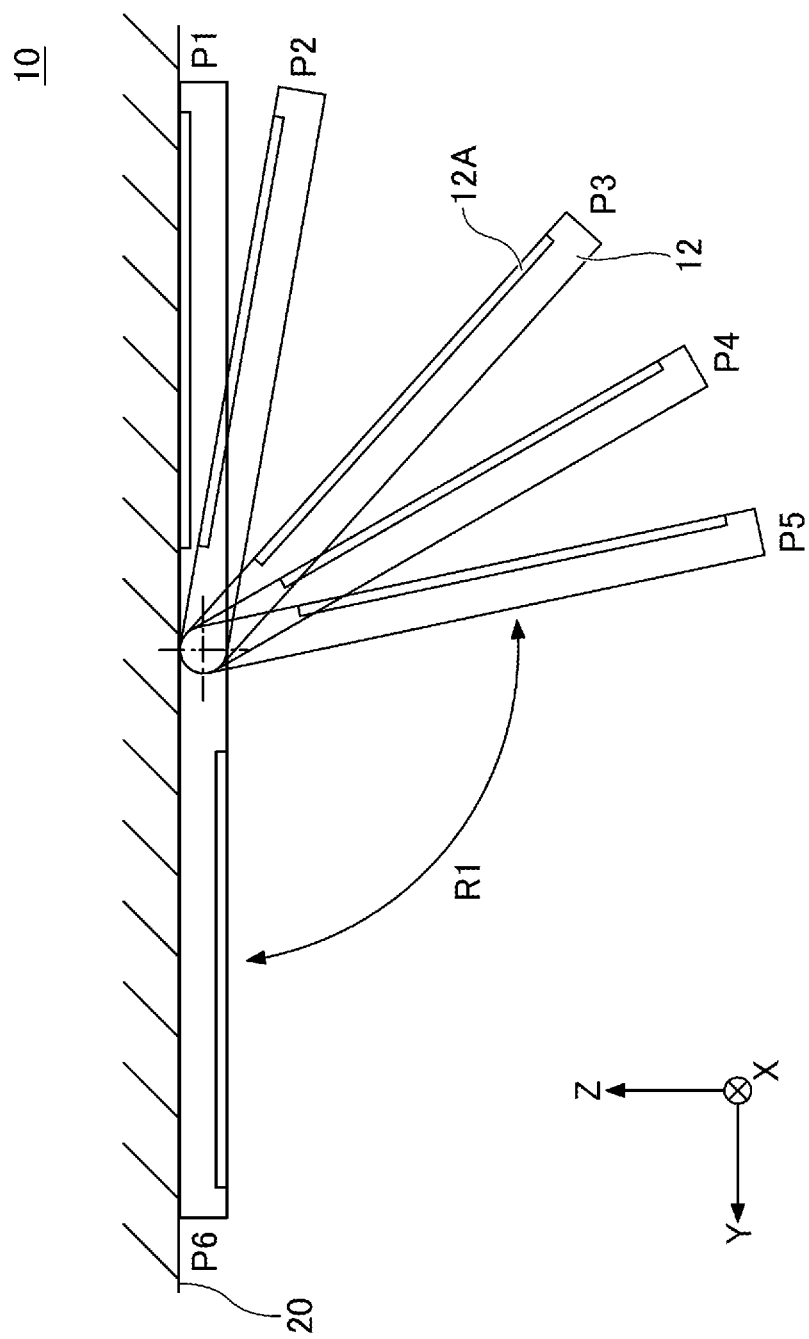
FIG. 1 is a view for describing an opening or closing operation of a display device according to one embodiment.

Hereinafter, referring to the drawings, one embodiment of the present invention will be described.

(Opening or Closing Operation of Display Device 10)

FIG. 1 is a view for describing an opening or closing operation of a display device 10 according to one embodiment. Note that, in the present embodiment, for the sake of convenience, an X-axis direction, a Y-axis direction, and a Z-axis direction are defined as a left-and-right direction, a front-and-back direction, and an up-and-down direction, respectively.

As illustrated in FIG. 1, the display device 10 is installed on a ceiling face 20 in a vehicle cabin of a vehicle such as an automobile. The display device 10 includes a monitor 12 having a shape of a thin cuboid. The monitor 12 includes a display face 12A capable of displaying various videos (e.g., a liquid crystal panel or an organic EL panel). The display device 10 has a rotation axis AX near a top-end portion of the monitor 12, the rotation axis AX extending in a straight line in the left-and-right direction (X-axis direction). The monitor 12 allows for an opening or closing operation by moving rotationally around the rotation axis AX serving as the center.

The monitor 12 allows for the opening or closing operation between the closed position P1 and the opened position P6. At the closed position P1 (the opening or closing angle: 0°), the monitor 12 is horizontal along the ceiling face 20 backward of the rotation axis AX, and the display face 12A faces upward. At the opened position P6 (the opening or closing angle: 180°), the monitor 12 is horizontal along the ceiling face 20 forward of the rotation axis AX, and the display face 12A faces downward.

At the closed position P1, the opening or closing operation of the monitor 12 is locked by a locking mechanism (not illustrated). When a user operates, for example, a lock lever (not illustrated) to unlock the locking mechanism for the monitor 12 at the closed position P1, the monitor 12 is slightly moved rotationally by its own weight to the torque-generating position P2. Thereby, the display device 10 forms a gap between the monitor 12 and the ceiling face 20, so that the user can readily grab the monitor 12.

The monitor 12 has three click positions P3, P4, and P5 between the torque-generating position P2 and the opened position P6. When the monitor 12 is fixed at one of the three click positions P3, P4, and P5, passengers backward (in a negative direction on the Y axis) of the monitor 12 can view various videos displayed on the display face 12A.

Also, the monitor 12 has the sliding torque range R1 between the click position P5 and the opened position P6. The sliding torque range R1 is a range in which the monitor 12 is opened and closed while a certain amount of sliding resistance is being applied to the monitor 12. Therefore, when the user lets go of the monitor 12 at any opening or closing angle within the sliding torque range R1, the monitor 12 can maintain a stopped state at the opening or closing angle by the action of the applied sliding resistance.

Note that, the display device 10 includes an opening and closing mechanism 100 that will be described with reference to FIG. 2 and some of the subsequent drawings. The opening and closing mechanism 100 allows for the opening or closing operation in a state of retaining the monitor 12. Thereby, the display device 10 realizes the above-described opening or closing operation of the monitor 12.

In practice, the display device 10 includes a left and right pair of opening and closing mechanisms 100 that have left-right symmetrical structures. The left and right pair of opening and closing mechanisms 100 retain both left- and right-side portions of the monitor 12.

(Configuration of the Opening and Closing Mechanism 100)

Figure 2:
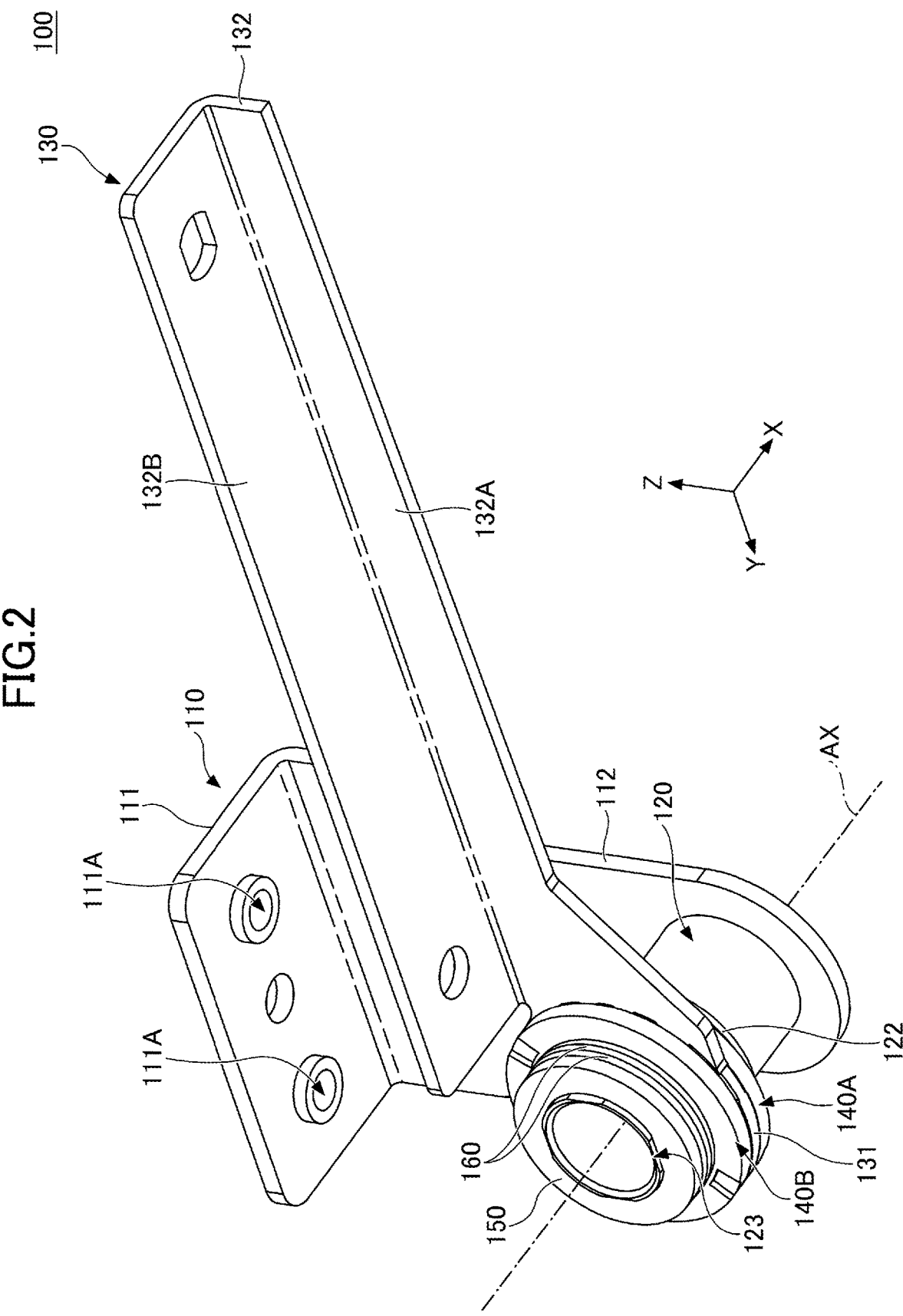
FIG. 2 is a perspective view of an outer appearance of an opening and closing mechanism according to one embodiment.
Figure 3:
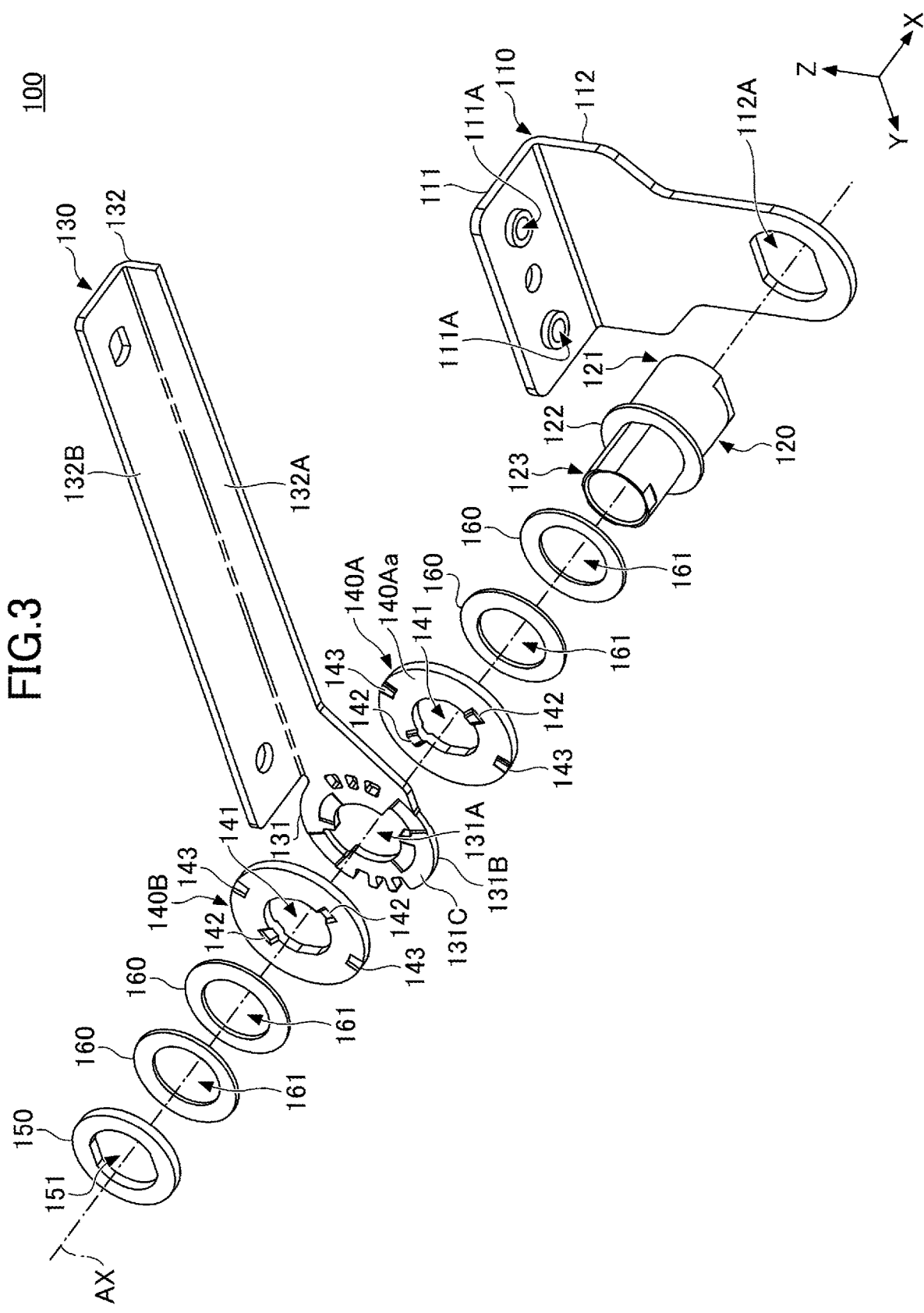
FIG. 3 is an exploded perspective view of an opening and closing mechanism according to one embodiment.

FIG. 2 is a perspective view of an outer appearance of the opening and closing mechanism 100 according to one embodiment. FIG. 3 is an exploded perspective view of the opening and closing mechanism 100 according to one embodiment.

As illustrated in FIG. 2 and FIG. 3, the opening and closing mechanism 100 includes a stand 110, a shaft 120, a bracket 130, a first cam member 140A, a second cam member 140B, a pressing plate 150, and a disc spring 160.

The stand 110 is a member that is fixed to an installation face 22 (see FIG. 4) provided on the ceiling face 20, and supports the shaft 120. The stand 110 has such an L shape that is formed by folding the top portion of a vertically extending metal plate at the right angle inward in the left-and-right direction (X-axis direction). The stand 110 includes a horizontal wall portion 111 and a vertical wall portion 112. The horizontal wall portion 111 is a plate portion fixed to the installation face 22 parallelly to the ceiling face 20. For example, in the present embodiment, the horizontal wall portion 111 has two through-holes 111A that penetrate the horizontal wall portion 111 in the up-and-down direction (Z-axis direction). The horizontal wall portion 111 is fixed to the installation face 22 with two fixing screws (not illustrated) that pass through the two through-holes 111A. The vertical wall portion 112 is a plate Portion that is provided to hang down from the outer edge of the horizontal wall portion 111 in the left-and-right direction (X-axis direction) and is vertical to the ceiling face 20. On the rotation axis AX in the vertical wall portion 112, a fitting hole 112A that penetrates the vertical wall portion 112 in the left-and-right direction (X-axis direction) is formed. When a back-end portion of the shaft 120 is fitted into the fitting hole 112A, the vertical wall portion 112 supports the back-end portion of the shaft 120. In the present embodiment, stainless steel is used as one example of the material of the stand 110. However, the material of the stand 110 is not limited to stainless steel.

The shaft 120 is a shaft-shaped (generally cylindrical) member that is disposed on the rotation axis AX and extends in a direction of the rotation axis AX. The shaft 120 supports the bracket 130 in a manner that the bracket 130 can move rotationally. The shaft 120 has a fitted portion 121 at the back-end portion (an outer end portion thereof in the left-and-right direction (X-axis direction)), the fitted portion 121 having the same shape as the fitting hole 112A of the stand 110. When the fitted Portion 121 is fitted into the fitting hole 112A, the shaft 120 is fixed to the vertical wall portion 112 of the stand 110 and supported by the vertical wall portion 112. Note that, the fitting hole 112A of the stand 110 and the fitted portion 121 of the shaft 120 have an elliptical shape. Thereby, the shaft 120 is stopped from rotating so as not to rotate around the rotation axis AX. A central portion of the shaft 120 is provided with a disc-shaped flange 122, and the diameter of the shaft 120 is partially large there. Also, the shaft 120 has a fitted portion 123 at a front-end portion thereof (an inner end portion thereof in the left-and-right direction (X-axis direction)), the fitted portion 123 having the same shape as a fitting hole 151 of the pressing plate 150. In the present embodiment, stainless steel is used as one example of the material of the shaft 120. However, the material of the shaft 120 is not limited to stainless steel.

The bracket 130 is one example of the "opening and closing member". The bracket 130 is a member that is configured to open or close the monitor 12 by moving rotationally around the rotation axis AX serving as the center, while retaining the monitor 12. The bracket 130 includes the rotating portion 131 and a retaining portion 132.

The rotating portion 131 is an annular and plate-shaped portion disposed on the rotation axis AX. The rotating portion 131 rotates around the rotation axis AX serving as the center, in response to the opening or closing operation of the bracket 130. In a central portion of the rotating portion 131, an opening 131A having a shape of a circle with the center on the rotation axis AX is formed. When the shaft 120 is inserted into the opening 131A, the bracket 130 is supported by the shaft 120 in a manner that the bracket 130 can move rotationally.

The retaining portion 132 is an arm-shaped portion that extends in a straight line from the rotating portion 131 outward in a radial direction. The retaining portion 132 retains the monitor 12 and moves rotationally together with the rotating portion 131. The retaining portion 132 has such an L shape that is formed by folding the top portion of a vertically extending metal plate at the right angle inward in the left-and-right direction (X-axis direction). The retaining portion 132 includes a vertical wall portion 132A and a horizontal wall portion 132B. The vertical wall portion 132A is a vertically extending long plate portion that extends in a straight line from the rotating portion 131 outward in a radial direction. The horizontal wall portion 132B is a long plate portion that extends inward in the left-and-right direction (X-axis direction) from an upper edge portion of the vertical wall portion 132A. On a top face of the horizontal wall portion 132B, a back face of the monitor 12 is fixed by any fixing means. When the opened or closed position of the bracket 130 is at the closed position P1, the horizontal wall portion 132B is horizontal (i.e., in parallel to the ceiling face 20). Thereby, when the opened or closed position of the bracket 130 is at the closed position P1, the horizontal wall portion 132B can make the monitor 12 horizontal along the ceiling face 20.

In the present embodiment, stainless steel is used as one example of the material of the bracket 130. However, the material of the bracket 130 is not limited to stainless steel.

The first cam member 140A and the second cam member 140B are disposed on the rotation axis AX to face each other, while sandwiching the rotating portion 131 of the bracket 130. The first cam member 140A and the second cam member 140B are each a disc-shaped member having, in a central portion thereof, an opening 141 that has a shape of a circle with the center on the rotation axis AX. The first cam member 140A and the second cam member 140B have shapes that are left-right symmetrical.

Specifically, when the shaft 120 is inserted into the opening 141, the first cam member 140A is disposed so as to be non-rotatable, facing a first sliding face 131B that is an outer surface of the rotating portion 131 in the left-and-right direction (X-axis direction). In response to rotation of the rotating portion 131, the first cam member 140A slides over the first sliding face 131B, thereby applying a load to the rotation of the rotating portion 131.

Meanwhile, when the shaft 120 is inserted into the opening 141, the second cam member 140B is disposed so as to be non-rotatable, facing a second sliding face 131C that is an inner surface of the rotating portion 131 in the left-and-right direction (X-axis direction). In response to rotation of the rotating portion 131, the second cam member 140B slides over the second sliding face 131C, thereby applying a load to the rotation of the rotating Portion 131.

That is, the opening and closing mechanism 100 of the present embodiment can apply a load to the rotation of the rotating portion 131 by sandwiching the rotating portion 131 between the first cam member 140A and the second cam member 140B.

Each of the first cam member 140A and the second cam member 140B is provided, on a rotating portion 131-facing surface, with two first cam projections 142 and two second cam projections 143 that project toward the rotating portion 131. The two first cam projections 142 on the rotating Portion 131-facing surface are provided at 180° intervals on a first circumference having the rotation axis AX as the center. The two second cam projections 143 on the rotating portion 131-facing surface are provided at 180° intervals on a second circumference having a larger radius than the first circumference having the rotation axis AX as the center.

In the present embodiment, carbon steel is used as one example of the material of the first cam member 140A and the second cam member 140B. However, the material of the first cam member 140A and the second cam member 140B is not limited to carbon steel.

The pressing plate 150 is a disc-shaped member fixed to the front-end portion of the shaft 120. A central portion of the pressing plate 150 is provided with the fitting hole 151 that penetrates the pressing plate 150 in the left-and-right direction (X-axis direction). When the front-end Portion (fitted portion 123) of the shaft 120 is fitted into the fitting hole 151, the pressing plate 150 is fixed to the front-end portion of the shaft 120 so as to be non-rotatable. Thereby, the pressing plate 150 prevents the bracket 130, the first cam member 140A, the second cam member 140B, and the disc spring 160 from dropping down from the shaft 120. In the present embodiment, stainless steel is used as one example of the material of the pressing plate 150. However, the material of the pressing plate 150 is not limited to stainless steel.

The disc spring 160 is one example of an "elastic member". The disc spring 160 is a disc-shaped member that has, in a central portion thereof, an opening 161 having a shape of a circle with the center on the rotation axis AX. The disc spring 160 has elasticity in the direction of the rotation axis AX (X-axis direction). The disc spring 160 is disposed on the rotation axis AX, and presses the first cam member 140A and the second cam member 140B toward the rotating portion 131 of the bracket 130.

Specifically, when the disc spring 160 is not provided, a gap (hereinafter referred to as an "outer gap") is formed between the first cam member 140A and the flange 122 of the shaft 120. Thereby, the first cam member 140A is provided so as to be movable by this outer gap in the direction of the rotation axis AX (X-axis direction).

When the shaft 120 is inserted into the opening 161 in the outer gap formed between the first cam member 140A and the flange 122 of the shaft 120, the disc spring 160 is disposed on the rotation axis AX. Thereby, the disc spring 160 presses the first cam member 140A toward the rotating portion 131 of the bracket 130. By the pressing force, the first cam member 140A is pressed against the first sliding face 131B of the rotating portion 131 of the bracket 130, thereby applying a load to a rotating force of the rotating portion 131. That is, the opening and closing mechanism 100 of the present embodiment is configured such that, the load applied from the first cam member 140A to the rotating force of the rotating portion 131 can be adjusted by adjusting the pressing force of the disc spring 160 (e.g., the number, thickness, and/or spring constant) between the first cam member 140A and the flange 122 of the shaft 120. For example, in the example as illustrated in FIG. 3, by the two disc springs 160 provided between the first cam member 140A and the flange 122 of the shaft 120, the load applied from the first cam member 140A to the rotating force of the rotating portion 131 is appropriately adjusted.

Note that, the disc spring 160 contracts in the direction of the rotation axis AX (X-axis direction) when a load is applied from the rotating portion 131 to the first cam member 140A upon rotation of the rotating portion 131 of the bracket 130. Thereby, it is possible to appropriately absorb a force generated when the first cam projections 142 and the second cam projections 143 of the first cam member 140A are pressed against the rotating portion 131.

Also, when the disc spring 160 is not provided, a gap (hereinafter referred to as an "inner gap") is formed between the second cam member 140B and the pressing plate 150. Thereby, the second cam member 140B is provided so as to be movable by this inner gap in the direction of the rotation axis AX (X-axis direction).

When the shaft 120 is inserted into the opening 161 in the inner gap formed between the second cam member 140B and the pressing plate 150, the disc spring 160 is disposed on the rotation axis AX. Thereby, the disc spring 160 presses the second cam member 140B toward the rotating portion 131 of the bracket 130. By the pressing force, the second cam member 140B is pressed against the second sliding face 131C of the rotating portion 131 of the bracket 130, thereby applying a load to the rotating force of the rotating portion 131. That is, the opening and closing mechanism 100 of the present embodiment is configured such that, the load applied from the second cam member 140B to the rotating force of the rotating portion 131 can be adjusted by adjusting the pressing force of the disc spring 160 (e.g., the number, thickness, and/or spring constant) between the second cam member 140B and the pressing plate 150. For example, in the example as illustrated in FIG. 3, by the two disc springs 160 provided between the second cam member 140B and the pressing plate 150, the load applied from the second cam member 140B to the rotating force of the rotating portion 131 is appropriately adjusted.

Note that, the disc spring 160 contracts in the direction of the rotation axis AX (X-axis direction) when a load is applied to the second cam member 140B from the rotating portion 131 upon rotation of the rotating portion 131 of the bracket 130. Thereby, it is possible to appropriately absorb a force generated when the first cam projections 142 and the second cam projections 143 of the second cam member 140B are pressed against the rotating portion 131.

(Opening or Closing Operation of the Opening and Closing Mechanism 100)

Figure 4:
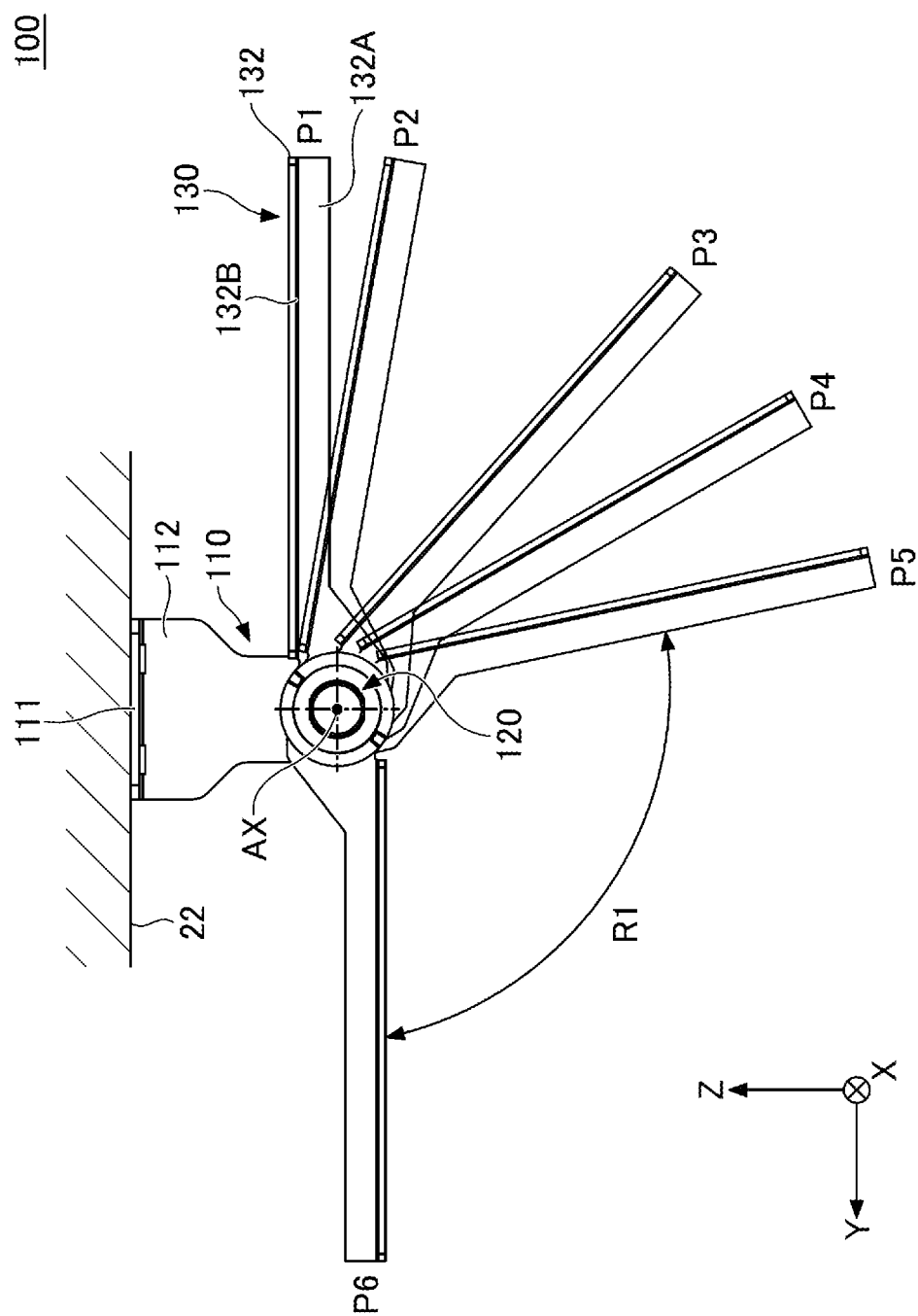
FIG. 4 is a view for describing an opening or closing operation of an opening and closing mechanism according to one embodiment.

FIG. 4 is a view for describing the opening or closing operation of the opening and closing mechanism 100 according to one embodiment. Note that, positions P1 to P6 as illustrated in FIG. 4 correspond to positions P1 to P6 as illustrated in FIG. 1.

As illustrated in FIG. 4, the opening and closing mechanism 100 is fixed to the installation face 22 where the horizontal wall portion 111 of the stand 110 is located above the ceiling face 20 in a vehicle cabin of a vehicle such as an automobile. In the opening and closing mechanism 100, the rotating portion 131 of the bracket 130 is supported by the shaft 120 so as to be rotatable. Thereby, the bracket 130 can move rotationally around the rotation axis AX serving as the center, and allows for the opening or closing operation.

The bracket 130 allows for the opening or closing operation between the closed position P1 and the opened position P6. At the closed position P1 (the opening or closing angle: 0°), the retaining portion 132 capable of retaining the monitor 12 is horizontal along the installation face 22 backward of the rotation axis AX. At the opened position P6 (the opening or closing angle: 180°), the retaining portion 132 is horizontal along the installation face 22 forward of the rotation axis AX.

The bracket 130 can be slightly moved rotationally by the weight of the bracket 130 itself from the closed position P1 to the torque-generating position P2.

The opening and closing mechanism 100 has three click positions P3, P4, and P5 between the torque-generating position P2 and the opened position P6.

Also, the opening and closing mechanism 100 has the sliding torque range R1 between the click position P5 and the opened position P6. The sliding torque range R1 is a range in which the bracket 130 is opened and closed while a certain amount of sliding resistance is being applied to the bracket 130. Therefore, when the user lets go of the bracket 130 at any opening or closing angle within the sliding torque range R1, the bracket 130 can maintain a stopped state at the opening or closing angle by the action of the applied sliding resistance.

Since the opening and closing mechanism 100 is configured to allow for the above-described opening or closing operation, it is possible to realize the opening or closing operation of the monitor 12 as illustrated in FIG. 1.

(Specific Configurations of the Rotating Portion 131 of the Bracket 130 and the Second Cam Member 140B)

Figure 5:
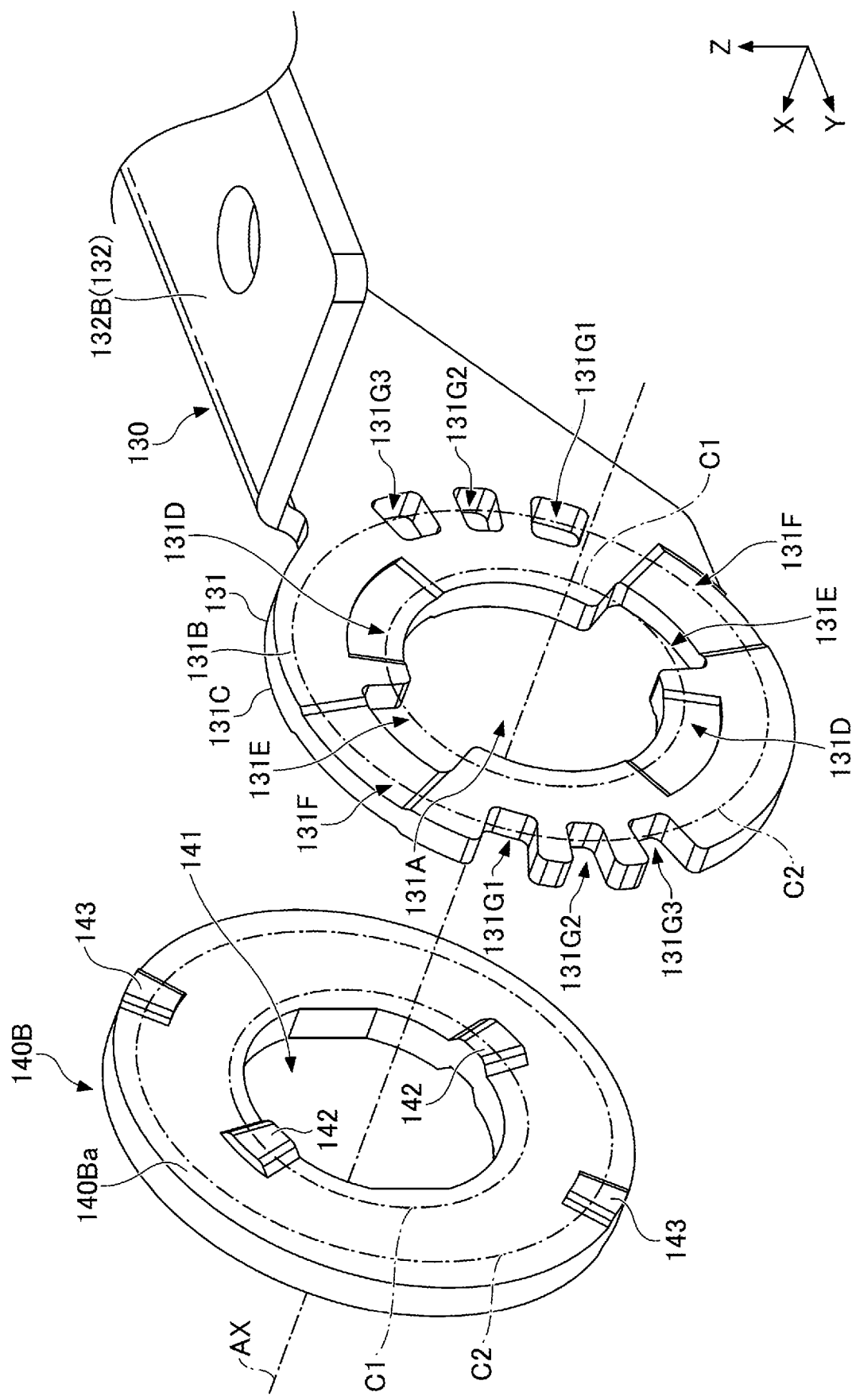
FIG. 5 is a perspective view of an outer appearance of a rotating portion of a bracket and a second cam member included in an opening and closing mechanism according to one embodiment.

FIG. 5 is a perspective view of an outer appearance of the rotating portion 131 of the bracket 130 and the second cam member 140B included the opening and closing mechanism 100 according to one embodiment.

As illustrated in FIG. 5, the second cam member 140B is provided, on a rotating portion 131-facing surface 140Ba, with two first cam projections 142 and two second cam projections 143 that project toward the rotating portion 131.

The two first cam projections 142 on the surface 140Ba are provided at 180° intervals on a first circumference C1 having the rotation axis AX as the center. In particular, in the example as illustrated in FIG. 5, the two first cam projections 142 on the surface 140Ba are provided at positions where the radius of the circumference is the smallest.

The two second cam projections 143 on the surface 140Ba are provided at 180° intervals on a second circumference C2 having a larger radius than the first circumference C1 having the rotation axis AX as the center. In particular, in the example as illustrated in FIG. 5, the two second cam projections 143 on the surface 140Ba are provided at positions where the radius of the circumference is the largest.

The first cam projection 142 and the second cam projection 143 are different in height from each other. In the present embodiment, the first cam projections 142 are higher in height than the second cam projections 143.

Note that, in the present embodiment, the first cam projections 142 and the second cam projections 143 each have a generally rectangular shape in the plan view thereof. In addition, in the present embodiment, both of the circumferential direction-facing side faces of the first cam projections 142 or the second cam projections 143 are tapered faces, thereby achieving smoothly riding on the below-described steps of the rotating portion 131.

Meanwhile, as illustrated in FIG. 5, the rotating portion 131 of the bracket 130 is provided, in the first sliding face 131B facing the first cam member 140A, with a pair of suppression portions 131D and a pair of avoidance portions 131E, each of the pairs being at 180° intervals on the first circumference C1.

The suppression portion 131D is formed in a recessed shape, and is provided to suppress a sliding load of the first cam projections 142 when the opened or closed position of the bracket 130 is between the closed position P1 and the torque-generating position P2. Therefore, the suppression portion 131D is formed in a fan shape on the first circumference C1 so as to have an angle range corresponding to the angles between the closed position P1 and the torque-generating position P2.

The avoidance portion 131E is formed in a cutout shape, and is provided to avoid sliding of the first cam projections 142 when the opened or closed position of the bracket 130 is between the click position P3 and the click position P5. Therefore, the avoidance portion 131E is formed in a fan shape on the first circumference C1 so as to have an angle range corresponding to the angles between the click position P3 and the click position P5.

Also, as illustrated in FIG. 5, the rotating portion 131 of the bracket 130 is provided, in the first sliding face 131B facing the first cam member 140A, with a pair of avoidance portions 131F, a pair of first fitting portions 131G1, a pair of second fitting portions 131G2, and a pair of third fitting portions 131G3, each of the pairs being at 180° intervals on the second circumference C2.

The avoidance portion 131F is formed in a recessed shape, and is provided to avoid sliding of the second cam projections 143 when the opened or closed position of the bracket 130 is between the closed position P1 and the torque-generating position P2. Therefore, the avoidance portion 131F is formed in a fan shape on the second circumference C2 so as to have an angle range corresponding to the angles between the closed position P1 and the torque-generating position P2.

The first fitting portion 131G1 is formed as a hole, and is provided to fix the bracket 130 at the opening or closing angle of the click position P3 by the second cam projection 143 being fitted thereinto, when the bracket 130 is at the opening or closing angle of the click position P3.

The second fitting portion 131G2 is formed as a hole, and is provided to fix the bracket 130 at the opening or closing angle of the click position P4 by the second cam projection 143 being fitted thereinto, when the bracket 130 is at the opening or closing angle of the click position P4.

The third fitting portion 131G3 is formed as a hole, and is provided to fix the bracket 130 at the opening or closing angle of the click position P5 by the second cam projection 143 being fitted thereinto, when the bracket 130 is at the opening or closing angle of the click position P5.

Note that, in the present embodiment, in conformity to the generally rectangular shape of the second cam projection 143, each of the first fitting Portion 131G1, the second fitting portion 131G2, and the third fitting portion 131G3 is formed in a generally rectangular shape.

Note that, the first cam member 140A and the second cam member 140B have left-right symmetrical shapes. That is, the second cam member 140B is provided, on a rotating portion 131-facing surface 140Aa, with two first cam projections 142 and two second cam projections 143 that project toward the rotating portion 131.

Also, the second sliding face 131C of the rotating portion 131 facing the first cam member 140A has a left-right symmetrical shape to that of the first sliding face 131B. That is, the second sliding face 131C is provided with a pair of suppression portions 131D and a pair of avoidance portions 131E, each of the pairs being at 180° intervals on the first circumference C1. Also, the second sliding face 131C is provided with a pair of avoidance portions 131F, a pair of first fitting portions 131G1, a pair of second fitting portions 131G2, and a pair of third fitting portions 131G3, each of the pairs being at 180° intervals on the second circumference C2.

Therefore, in the present embodiment, in response to the opening or closing operation of the bracket 130, the first cam member 140A and the second cam member 140B similarly slide over both the faces of the rotating portion 131 (the first sliding face 131B and the second sliding face 131C).

(Operation of the Opening and Closing Mechanism 100)

Hereinafter, referring to FIG. 6 to FIG. 12, operation of the opening and closing mechanism 100 according to one embodiment will be described. Note that, in the following description, the first cam member 140A and the second cam member 140B will be collectively referred to as a "cam member 140" because the first cam member 140A and the second cam member 140B move simultaneously and similarly.

<When the Opened or Closed Position of the Bracket 130 is at the Closed Position P1>

Figure 6:
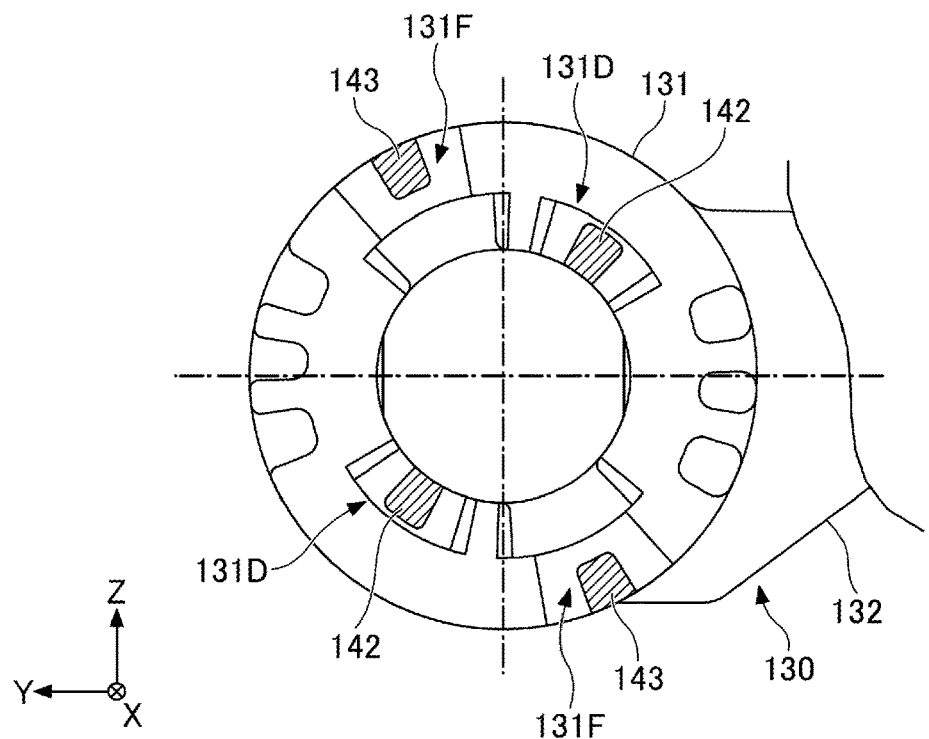
FIG. 6 is a view of a positional relationship between a rotating portion of a bracket and cam projections in an opening and closing mechanism according to one embodiment (when the opened or closed position of the bracket is at a closed position P1).

FIG. 6 is a view of a positional relationship between the rotating portion 131 of the bracket 130 and the cam projections 142 and 143 in the opening and closing mechanism 100 according to one embodiment (when the opened or closed position of the bracket 130 is at the closed position P1).

As illustrated in FIG. 6, when the opened or closed position of the bracket 130 is at the closed position P1, the first cam projections 142 contact the suppression portions 131D that are formed on the rotating portion 131. The cam member 140 is pushed toward a direction away from the rotating portion 131 by the first cam projections 142, while compressing the disc spring 160. Therefore, when the bracket 130 is opened from the closed position P1 to the torque-generating position P2, the first cam projections 142 receive a pressing force from the disc spring 160 to slide over the suppression portions 131D, thereby applying a load to the opening operation of the bracket 130. However, since the suppression portions 131D are formed in a recessed shape, the amount by which the suppression Portions 131D compress the disc spring 160 is reduced commensurately; i.e., the pressing force that the first cam projections 142 receive from the disc spring 160 is reduced commensurately. Thus, the load applied from the first cam projections 142 is suppressed as compared to the case of sliding over a portion where the suppression portions 131D are not formed. Therefore, when the bracket 130 is opened from the closed position P1 to the torque-generating position P2, the first cam projections 142 slide over the suppression portions 131D, and apply a relatively small load to the opening operation of the bracket 130.

Meanwhile, as illustrated in FIG. 6, when the opened or closed position of the bracket 130 is at the closed position P1, the second cam projections 143 are at positions facing the avoidance portions 131F that are formed in the rotating portion 131. Here, the avoidance portions 131F are formed in a recessed shape, the height of the second cam projections 143 is less than the height of the first cam projections 142, and moreover, as described above, the cam member 140 is pushed toward the direction away from the rotating portion 131. Thus, the second cam projections 143 do not contact the avoidance portions 131F. Therefore, when the bracket 130 is opened from the closed position P1 to the torque-generating position P2, the second cam projections 143 do not slide over the rotating Portion 131.

<When the Opened or Closed Position of the Bracket 130 is at the Torque-Generating Position P2>

Figure 7:
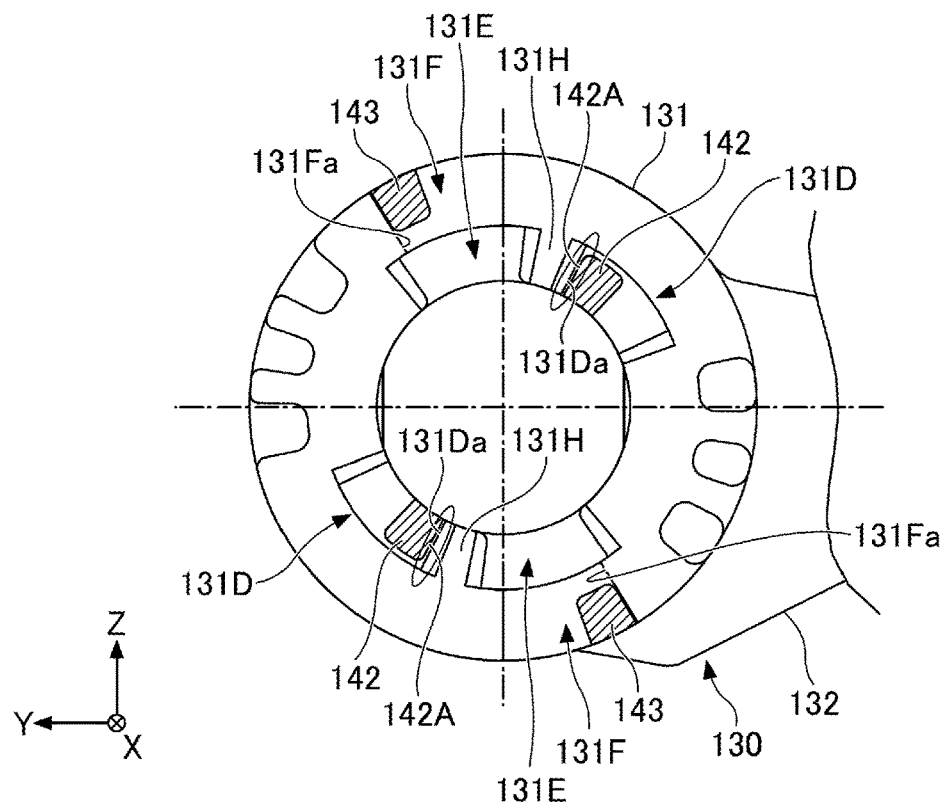
FIG. 7 is a view of a positional relationship between a rotating portion of a bracket and cam projections in an opening and closing mechanism according to one embodiment (when the opened or closed position of the bracket is at a torque-generating position P2).

FIG. 7 is a view of a positional relationship between the rotating portion 131 of the bracket 130 and the cam projections 142 and 143 in the opening and closing mechanism 100 according to one embodiment (when the opened or closed position of the bracket 130 is at the torque-generating position P2).

As illustrated in FIG. 7, when the bracket 130 is opened to the torque-generating position P2, side-wall portions 142A of the first cam projections 142 butt against inner-wall faces 131Da at end portions in a circumferential direction of the suppression portions 131D (see encircled portions in the figure). Thereby, the opening operation of the bracket 130 is stopped, and when from this state, the bracket 130 is further opened by the application of an operating load from a user, the first cam projections 142 go over the steps at the end portions in the circumferential direction of the suppression portions 131D and ride on sliding portions 131H between the suppression portions 131D and the avoidance portions 131E. At this time, the rapid change in the operating load gives a sensation of clicking to the user's operation. Thereby, the cam member 140 further compresses the disc spring 160, and is further pushed toward the direction away from the rotating portion 131. That is, the cam member 140 is pushed by the maximum amount toward the direction away from the rotating portion 131. Therefore, when the bracket 130 is opened from the torque-generating position P2 to the click position P3, the first cam projections 142 slide over the sliding portions 131H by receiving the pressing force from the disc spring 160, and apply a load to the opening operation of the bracket 130. At this time, the sliding portions 131H are flat, the amount by which the disc spring 160 is compressed becomes the maximum; i.e., the pressing force received from the disc spring 160 becomes the maximum. Thus, the load applied by the first cam projections 142 becomes the maximum. Therefore, when the bracket 130 is opened from the torque-generating position P2 to the click position P3, the first cam projections 142 slide over the sliding portions 131H, and apply the maximum load to the opening operation of the bracket 130.

Meanwhile, as illustrated in FIG. 7, when the bracket 130 is opened to the torque-generating position P2, the second cam projections 143 move to positions facing end portions 131Fa in a circumferential direction of the avoidance portions 131F. However, the height of the second cam projections 143 is less than the height of the first cam projections 142, and moreover, as described above, the cam member 140 is pushed by the maximum amount toward the direction away from the rotating portion 131. Thus, the second cam projections 143 do not contact the end portions 131Fa in the circumferential direction of the avoidance portions 131F. Therefore, when the bracket 130 is opened from the torque-generating position P2 to the click position P3, the second cam projections 143 do not slide over the rotating portion 131.

<When the Opened or Closed Position of the Bracket 130 is at the Click Position P3>

Figure 8:
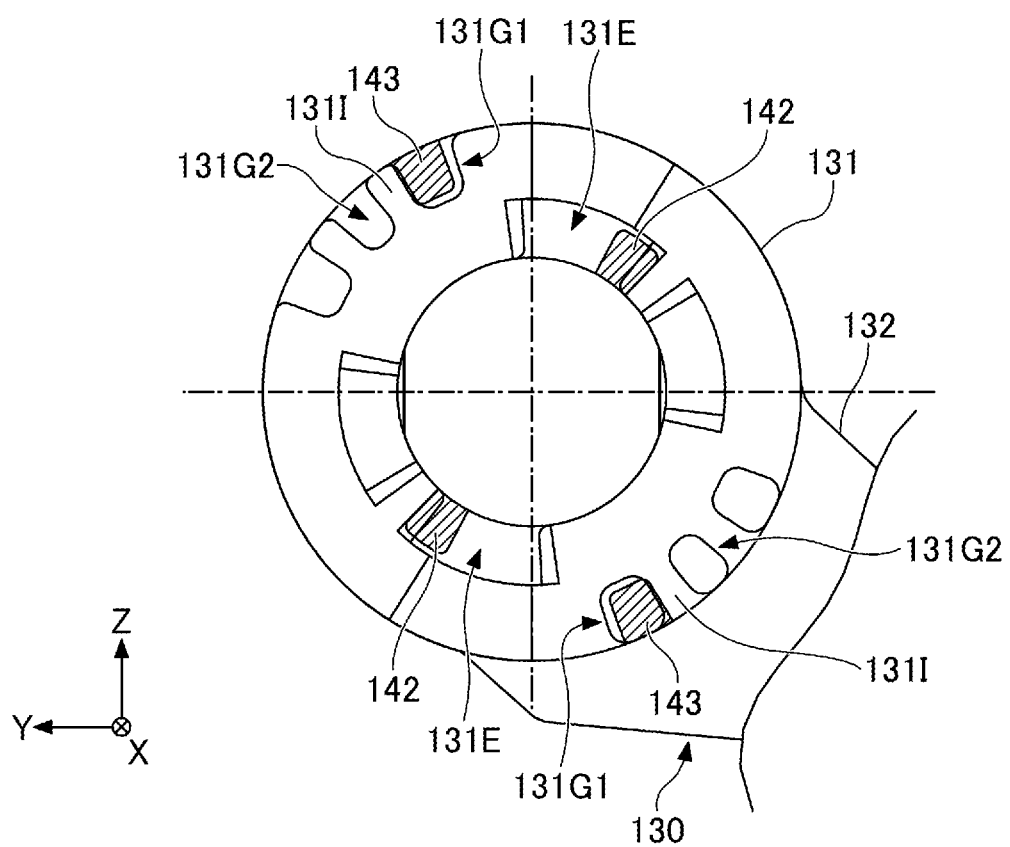
FIG. 8 is a view of a positional relationship between a rotating portion of a bracket and cam projections in an opening and closing mechanism according to one embodiment (when the opened or closed position of the bracket is at a click position P3).

FIG. 8 is a view of a positional relationship between the rotating portion 131 of the bracket 130 and the cam projections 142 and 143 in the opening and closing mechanism 100 according to one embodiment (when the opened or closed position of the bracket 130 is at the click position P3).

As illustrated in FIG. 8, when the bracket 130 is opened to the click position P3, the first cam projections 142 drop into the avoidance portions 131E that are each formed in a cutout shape. Thereby, the pushing of the cam member 140 by the first cam projections 142 is released, and the cam member 140 moves in a direction becoming closer to the rotating portion 131 by receiving the pressing force from the disc spring 160, and is pressed against the rotating portion 131. At the same time, the second cam projections 143 are fitted into the first fitting portions 131G1. Thereby, the bracket 130 is fixed at the opening or closing angle of the click position P3. At this time, the rapid reduction in the operating load gives a sensation of clicking to the user's operation.

When from the state as illustrated in FIG. 8, the bracket 130 is further opened by the application of the operating load from the user, the second cam projections 143 go over the steps at the end portions in a circumferential direction of the first fitting portion 131G1 and ride on sliding portions 131I between the first fitting portions 131G1 and the second fitting portions 131G2. At this time, the rapid change in the operating load gives a sensation of clicking to the user's operation. Thereby, the cam member 140 compresses the disc spring 160, and is pushed toward the direction away from the rotating portion 131. Therefore, when the bracket 130 is opened from the click position P3 to the click position P4, the second cam projections 143 slide over the sliding portions 131I by receiving the pressing force from the disc spring 160, and apply a load to the opening operation of the bracket 130. At this time, since the sliding portions 131I are flat but the height of the second cam projections 143 is relatively low, the amount by which the disc spring 160 is compressed becomes a middle amount; i.e., the pressing force received from the disc spring 160 becomes a middle amount. Thus, the load applied by the second cam projections 143 becomes a middle amount. Therefore, when the bracket 130 is opened from the click position P3 to the click position P4, the second cam projections 143 slide over the sliding portions 131I, and apply a middle amount of load to the opening operation of the bracket 130.

Note that, when the bracket 130 is opened from the click position P3 to the click position P4, the first cam projections 142 do not slide over the rotating portion 131 because the first cam Projections 142 remain dropped into the avoidance portions 131E.

<When the Opened or Closed Position of the Bracket 130 is at the Click Position P4>

Figure 9:
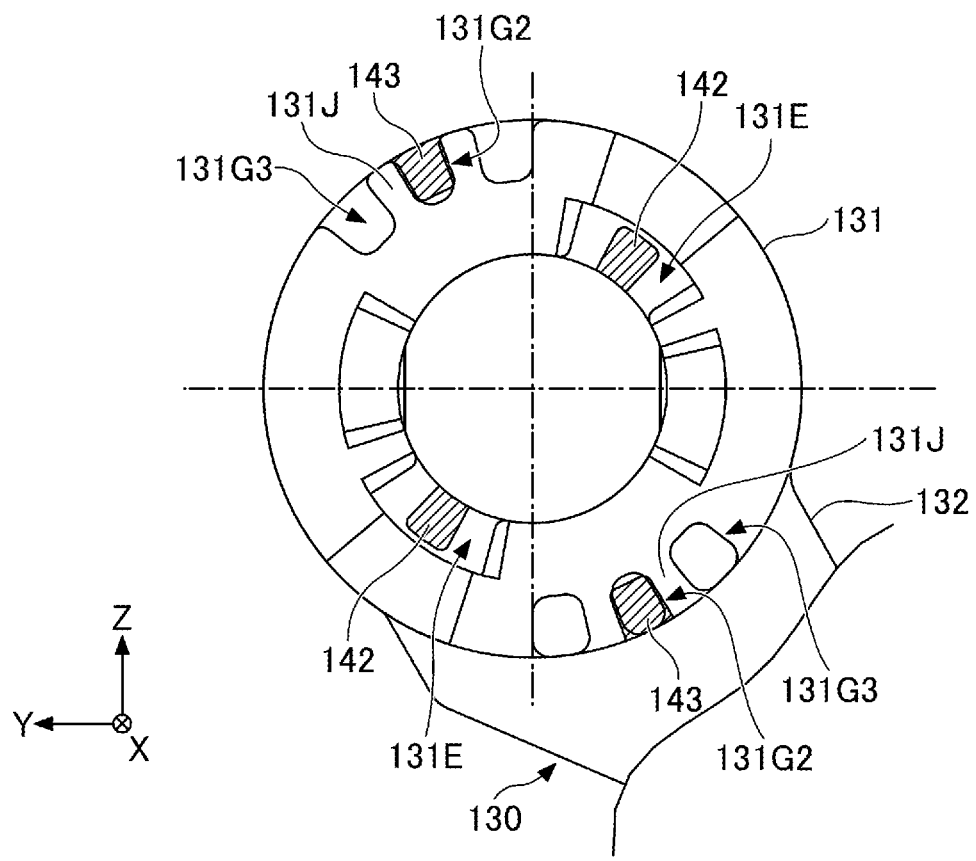
FIG. 9 is a view of a positional relationship between a rotating portion of a bracket and cam projections in an opening and closing mechanism according to one embodiment (when the opened or closed position of the bracket is at a click position P4).

FIG. 9 is a view of a positional relationship between the rotating portion 131 of the bracket 130 and the cam projections 142 and 143 in the opening and closing mechanism 100 according to one embodiment (when the opened or closed position of the bracket 130 is at the click position P4).

As illustrated in FIG. 9, when the bracket 130 is opened to the click position P4, the second cam projections 143 are fitted into the second fitting portions 131G2. Thereby, the bracket 130 is fixed at the opening or closing angle of the click position P4. At the same time, the pushing of the cam member 140 by the second cam projections 143 is released, and the cam member 140 moves in the direction becoming closer to the rotating portion 131 by receiving the pressing force from the disc spring 160, and is pressed against the rotating portion 131. At this time, the rapid reduction in the operating load gives a sensation of clicking to the user's operation.

When from the state as illustrated in FIG. 9, the bracket 130 is further opened by the application of the operating load from the user, the second cam projections 143 go over the steps at the end portions in a circumferential direction of the second fitting portions 131G2 and ride on sliding Portions 131J between the second fitting portions 131G2 and the third fitting portions 131G3. At this time, the rapid change in the operating load gives a sensation of clicking to the user's operation. Thereby, the cam member 140 compresses the disc spring 160, and is pushed toward the direction away from the rotating portion 131. Therefore, when the bracket 130 is opened from the click position P4 to the click position P5, the second cam projections 143 slide over the sliding portions 131J by receiving the pressing force from the disc spring 160, and apply a load to the opening operation of the bracket 130. At this time, since the sliding portions 131J are flat but the height of the second cam projections 143 is relatively low, the amount by which the disc spring 160 is compressed becomes a middle amount; i.e., the pressing force received from the disc spring 160 becomes a middle amount. Thus, the load applied by the second cam projections 143 becomes a middle amount. Therefore, when the bracket 130 is moved rotationally from the click position P4 to the click position P5, the second cam projections 143 slide over the sliding portions 131J, and apply a middle amount of load to the opening operation of the bracket 130.

Note that, when the bracket 130 is moved rotationally from the click position P4 to the click position P5, the first cam projections 142 do not slide over the rotating portion 131 because the first cam projections 142 remain dropped into the avoidance portions 131E.

<When the Opened or Closed Position of the Bracket 130 is at the Click Position P5>

Figure 10:
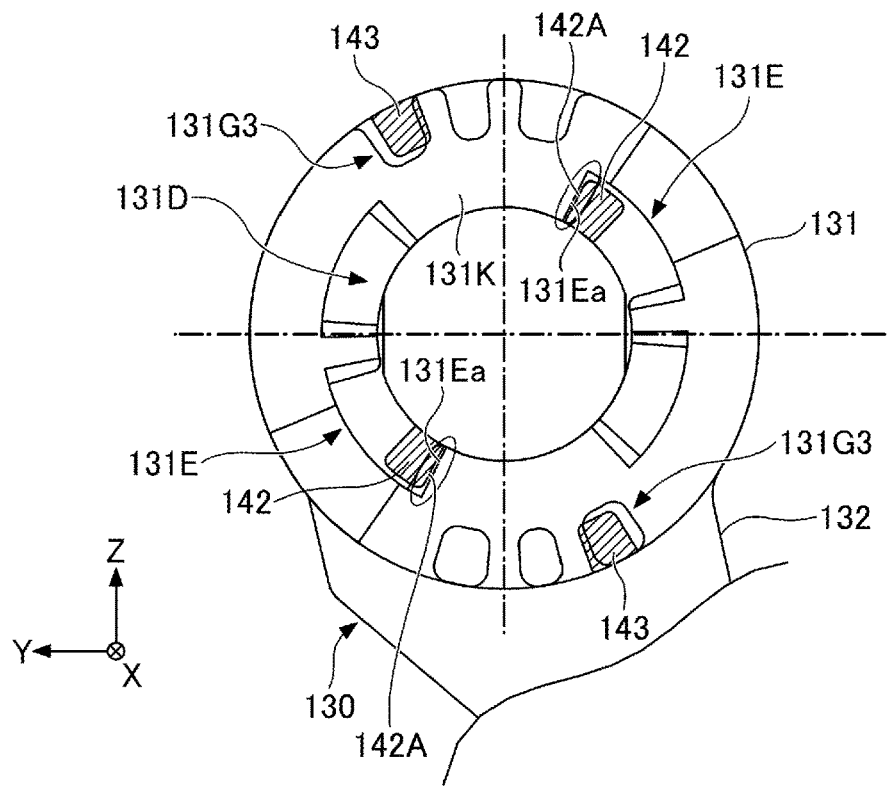
FIG. 10 is a view of a positional relationship between a rotating portion of a bracket and cam projections in an opening and closing mechanism according to one embodiment (when the opened or closed position of the bracket is at a click position P5).

FIG. 10 is a view of a positional relationship between the rotating portion 131 of the bracket 130 and the cam projections 142 and 143 in the opening and closing mechanism 100 according to one embodiment (when the opened or closed position of the bracket 130 is at the click position P5).

As illustrated in FIG. 10, when the bracket 130 is opened to the click position P5, the second cam projections 143 are fitted into the third fitting portions 131G3. Thereby, the bracket 130 is fixed at the opening or closing angle of the click position P5. At the same time, the pushing of the cam member 140 by the second cam projections 143 is released, and the cam member 140 moves in the direction becoming closer to the rotating portion 131 by receiving the pressing force from the disc spring 160, and is pressed against the rotating portion 131. At this time, the rapid reduction in the operating load gives a sensation of clicking to the user's operation.

As illustrated in FIG. 10, when the bracket 130 is opened to the click position P5, the side-wall Portions 142A of the first cam projections 142 butt against inner-wall faces 131Ea at end portions in a circumferential direction of the avoidance portions 131E (see encircled portions in the figure).

<When the Opened or Closed Position of the Bracket 130 is within the Sliding Torque Range R1>

Figure 11:
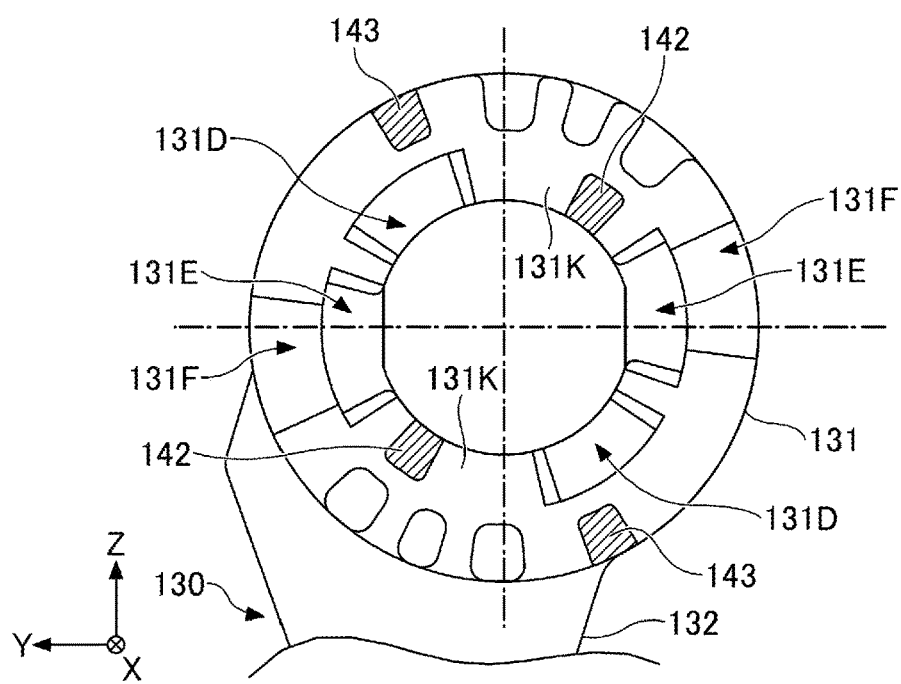
FIG. 11 is a view of a positional relationship between a rotating portion of a bracket and cam projections in an opening and closing mechanism according to one embodiment (when the opened or closed position of the bracket is within a sliding torque range R1).

FIG. 11 is a view of a positional relationship between the rotating portion 131 of the bracket 130 and the cam projections 142 and 143 in the opening and closing mechanism 100 according to one embodiment (when the opened or closed position of the bracket 130 is within the sliding torque range R1).

When from the state as illustrated in FIG. 10, the bracket 130 is further opened by the application of the operating load from the user, the first cam projections 142 go over the steps at the end portions in the circumferential direction of the avoidance portions 131E and ride on sliding portions 131K (flat portions) between the avoidance portions 131E and the suppression portions 131D, as illustrated in FIG. 11. At this time, the rapid change in the operating load gives a sensation of clicking to the user's operation. Thereby, the cam member 140 compresses the disc spring 160 by the maximum amount, and is pushed by the maximum amount toward the direction away from the rotating portion 131. Thus, when the bracket 130 is opened over the sliding torque range R1 from the click position P5 to the opened position P6, the first cam projections 142 slide over the sliding portions 131K by receiving the maximum amount of pressing force from the disc spring 160 and apply the maximum amount of load to the opening operation of the bracket 130.

Meanwhile, as illustrated in FIG. 11, when the bracket 130 is opened in the sliding torque range R1, the second cam projections 143 move at positions facing a flat portion of the rotating portion 131 (between the third fitting portion 131G3 and the avoidance portion 131F). However, the height of the second cam projections 143 is less than the height of the first cam projections 142, and moreover, as described above, the cam member 140 is pushed by the maximum amount toward the direction away from the rotating portion 131. Thus, the second cam projections 143 do not contact the flat portion of the rotating portion 131. Therefore, when the bracket 130 is opened over the sliding torque range R1, the second cam projections 143 do not slide over the rotating portion 131.

<When the Opened or Closed Position of the Bracket 130 is at the Opened Position P6 (the Opening or Closing Angle: 180°)>

Figure 12:
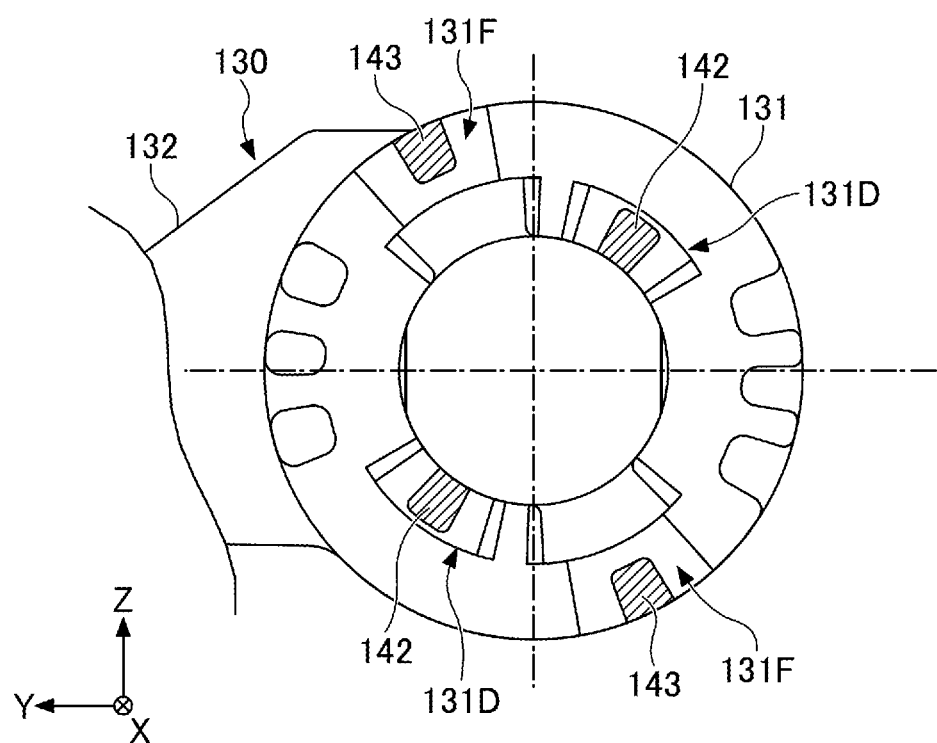
FIG. 12 is a view of a positional relationship between a rotating portion of a bracket and cam projections in an opening and closing mechanism according to one embodiment (when the opened or closed position of the bracket is at an opened position P6).

FIG. 12 is a view of a positional relationship between the rotating portion 131 of the bracket 130 and the cam projections 142 and 143 in the opening and closing mechanism 100 according to one embodiment (when the opened or closed position of the bracket 130 is at the opened position P6 (the opening or closing angle: 180°)).

As illustrated in FIG. 12, when the bracket 130 is opened to the position P6, the first cam projections 142 drop into the suppression portions 131D formed in the rotating portion 131 (the suppression portions 131D at positions different by 180° from the suppression portions 131D in FIG. 6). Thereby, the cam member 140 compresses the disc spring 160, and is pushed by the first cam projections 142 toward the direction away from the rotating portion 131. Therefore, when the bracket 130 is at the opened position P6, the first cam projections 142 press the suppression portions 131D by receiving the pressing force from the disc spring 160, and apply a load to the opening operation of the bracket 130. However, since the suppression portions 131D are formed in a recessed shape, the amount by which the suppression portions 131D compress the disc spring 160 is reduced commensurately; i.e., the pressing force that the first cam projections 142 receive from the disc spring 160 is reduced commensurately. Thus, the load applied from the first cam projections 142 is suppressed as compared to the case of sliding over a flat portion where the suppression portions 131D are not formed. Therefore, when the bracket 130 is at the opened position P6, the first cam projections 142 press the suppression portions 131D, and apply a relatively small load to the opening operation of the bracket 130.

Meanwhile, as illustrated in FIG. 12, when the bracket 130 is opened to the opened position P6, the second cam projections 143 are at positions facing the avoidance portions 131F formed in the rotating portion 131 (the avoidance portions 131F at positions different by 180° from the avoidance portions 131F in FIG. 6). However, since the avoidance portions 131F are formed in a recessed shape, the height of the second cam projections 143 is less than the height of the first cam projections 142, and moreover, as described above, the cam member 140 is pushed toward the direction away from the rotating portion 131. Thus, when the bracket 130 is at the opened position P6, the second cam projections 143 do not contact the rotating portion 131.

(Sliding Portions of Cam Projections 142 and 143)

Figure 13:
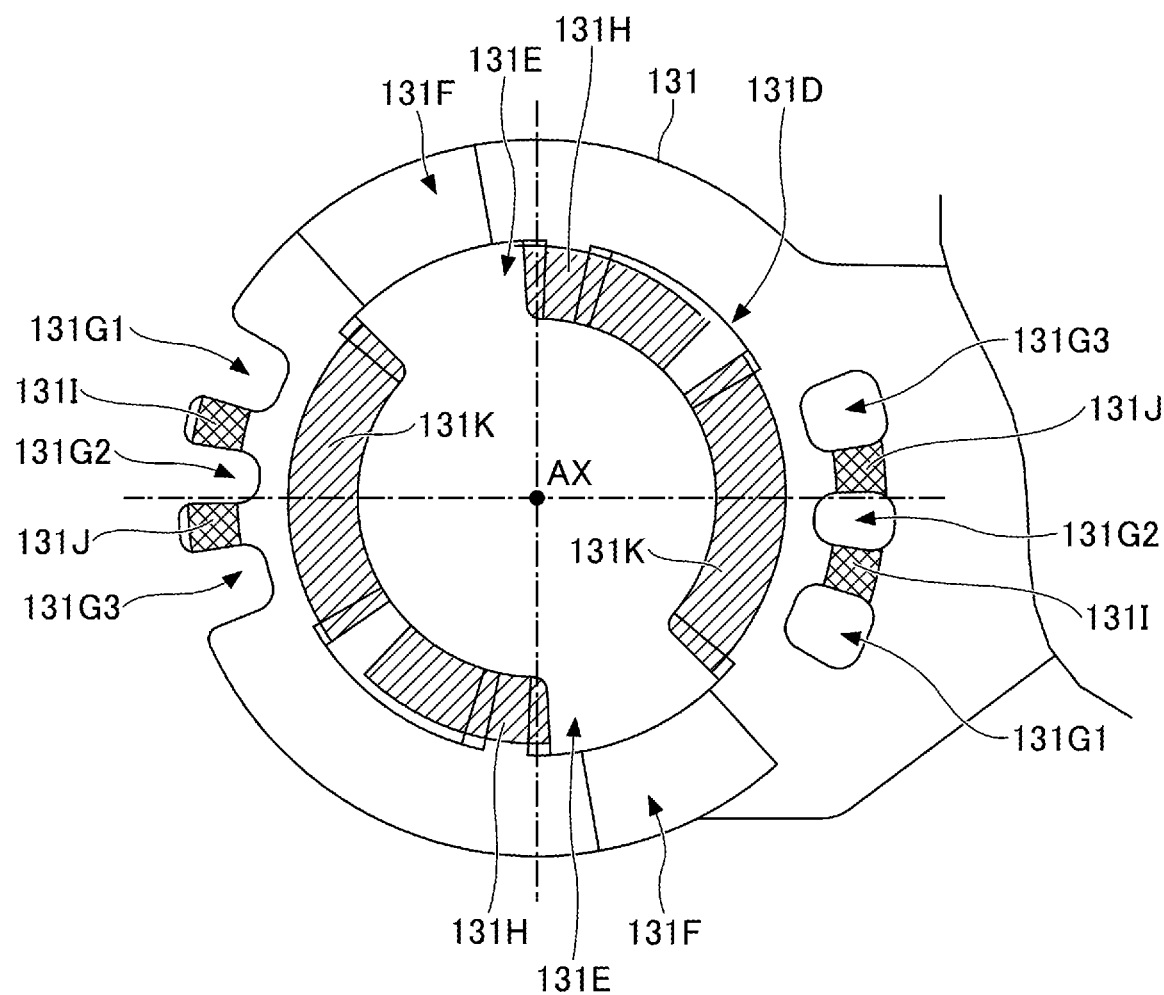
FIG. 13 is a view of sliding portions of cam projections in a rotating portion of a bracket included in an opening and closing mechanism according to one embodiment.

FIG. 13 is a view of sliding portions of the cam projections 142 and 143 in the rotating portion 131 of the bracket 130 included in the opening and closing mechanism 100 according to one embodiment.

As illustrated in FIG. 13, portions over which the first cam projections 142 slide in the rotating portion 131 are only the suppression portions 131D, the sliding portions 131H between the suppression portions 131D and the avoidance portions 131E, and the sliding portions 131K between the avoidance portions 131E and the suppression portions 131D.

Meanwhile, as illustrated in FIG. 13, portions over which the second cam projections 143 slide in the rotating portion 131 are only the sliding portions 131I between the first fitting portions 131G1 and the second fitting portions 131G2, and the sliding portions 131J between the second fitting portions 131G2 and the third fitting portions 131G3.

That is, the first cam projections 142 slide over the rotating portion 131 only when the bracket 130 is moved rotationally from the closed position P1 to the click position P3 and only when the bracket 130 is moved rotationally from the click position P5 to the opened position P6.

Meanwhile, the second cam projections 143 slide over the rotating portion 131 only when the bracket 130 is opened from the click position P3 to the click position P5.

In this manner, the opening and closing mechanism 100 according to one embodiment has: a first angle range in which the first cam projections 142 slide over the rotating portion 131 and the second cam projections 143 do not slide over the rotating portion 131 (from the closed position P1 to the click position P3, and from the click position P5 to the opened position P6); and a second angle range in which the second cam projections 143 slide over the rotating portion 131 and the first cam projections 142 do not slide over the rotating portion 131 (from the click position P3 to the click position P5).

With this configuration, in accordance with the opening or closing angle of the bracket 130, the opening and closing mechanism 100 according to one embodiment can distribute the sliding over the rotating portion 131 between the first cam projections 142 and the second cam projections 143. Thus, it is possible to increase wear resistance of each of the first cam projections 142 and the second cam projections 143.

Also, in accordance with the opening or closing angle of the bracket 130, the opening and closing mechanism 100 according to one embodiment can distribute occurrences of the clicks caused by riding on the steps of the rotating portion 131 between the first cam projections 142 and the second cam projections 143. Thus, it is possible to increase wear resistance of each of the first cam projections 142 and the second cam projections 143.

Note that, a range of from the closed position P1 to the click position P3 and a range of from the click position P5 to the opened position P6 are also a third angle range in which when the cam projections that are higher in height (the first cam projections 142) slide over the rotating portion 131, the cam projections that are lower in height (the second cam projections 143) do not slide over the rotating portion 131. That is, the opening and closing mechanism 100 according to one embodiment has a height difference between the first cam projections 142 and the second cam projections 143. Thus, it is possible to easily form a section of the rotating portion 131 which the second cam projections 143 do not slide over.

EXAMPLES

Figure 14:
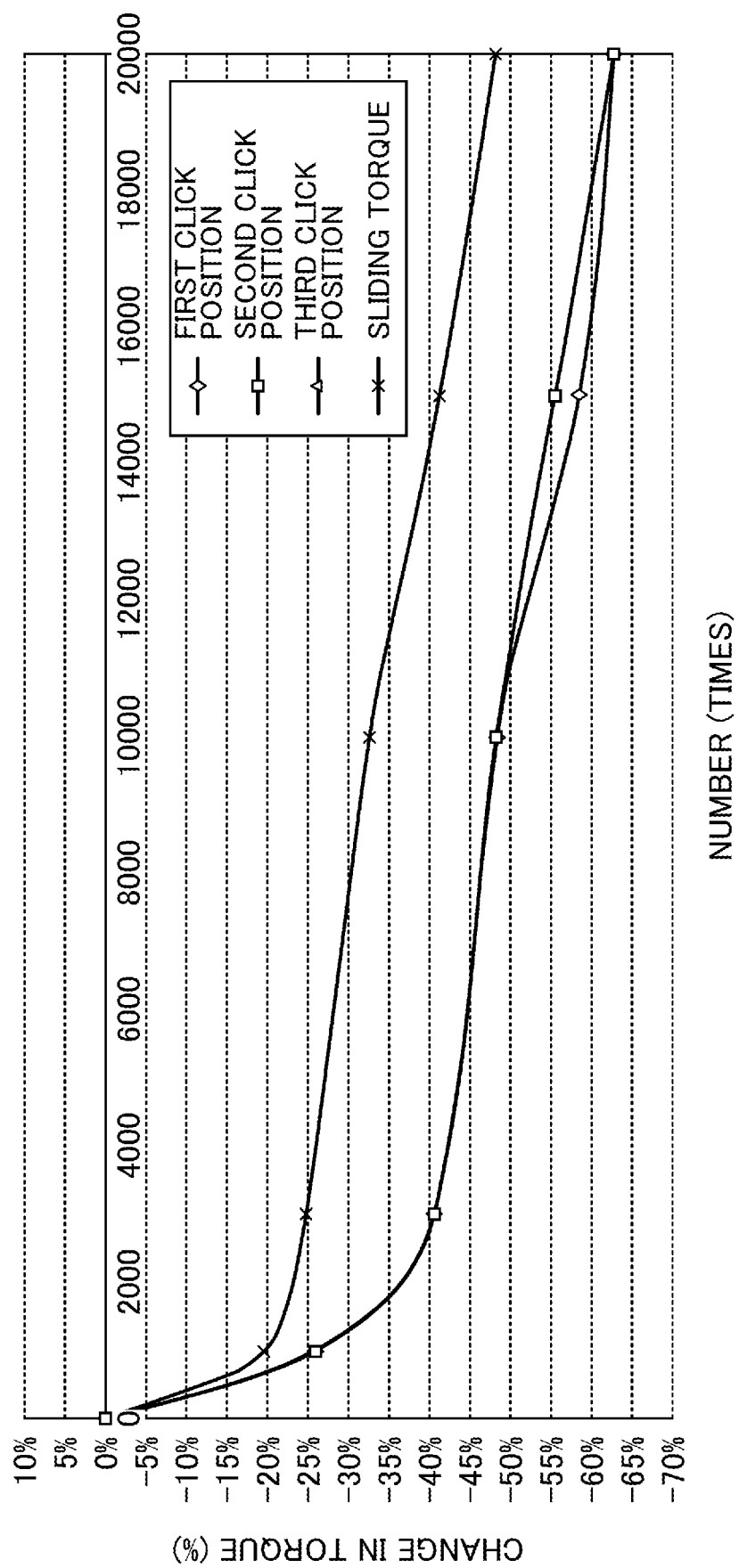
FIG. 14 depicts a graph of results obtained by performing a durability test for a conventional opening and closing mechanism.
Figure 15:
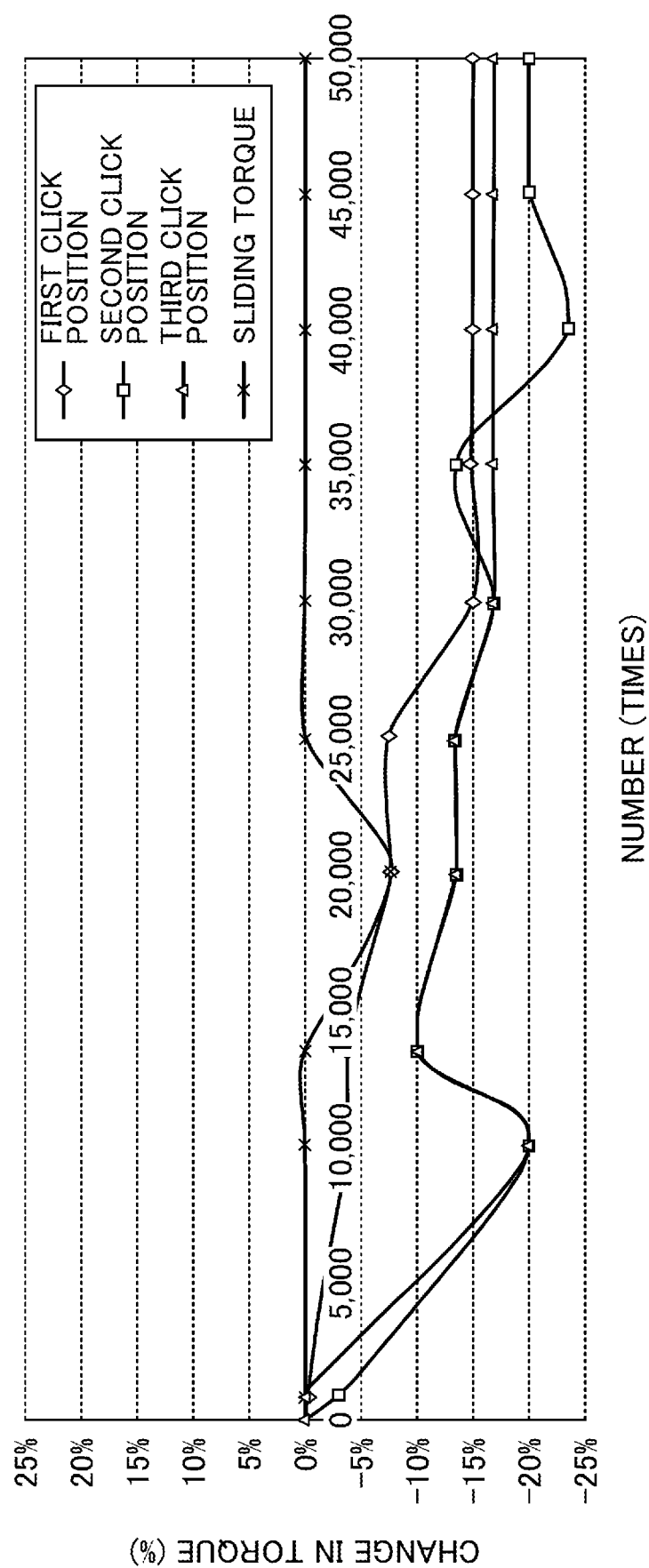
FIG. 15 depicts a graph of results obtained by performing a durability test for an opening and closing mechanism according to one embodiment.

FIG. 14 depicts a graph of results obtained by Performing a durability test for a conventional opening and closing mechanism. FIG. 15 depicts a graph of results obtained by performing a durability test for the opening and closing mechanism 100 according to one embodiment.

In the present embodiment, for each of the conventional opening and closing mechanism and the opening and closing mechanism 100 according to one embodiment, change in torque with increasing of the number of tests was measured with respect to torque at the time of occurrence of click at each of the click positions and for sliding torque.

Note that, the conventional opening and closing mechanism was configured as follows: a cam member was provided, on one circumference thereof (corresponding to the second circumference), with a pair of cam projections; and a rotating portion was provided, on one circumference thereof (corresponding to the second circumference), with a Pair of first fitting portions, a pair of second fitting portions, and a pair of third fitting portions.

As illustrated in FIG. 14, the conventional opening and closing mechanism was found to show considerable reduction in the change in torque with increasing of the number of the tests.

Meanwhile, as illustrated in FIG. 15, the opening and closing mechanism 100 according to one embodiment was found to show suppressed reduction in the change in torque with increasing of the number of the tests.

While preferable embodiments of the present invention have been described above in detail, the present invention is not limited to the specific embodiments, and various modifications and changes are possible within the scope of the subject matter as recited in the claims.

For example, in the embodiment, two first cam projections 142 are provided on the first circumference C1, which is however non-limiting. One first cam projection 142 or three or more first cam projections 142 may be provided on the first circumference C1.

Also, for example, in the embodiment, two second cam projections 143 are provided on the second circumference C2, which is however non-limiting. One second cam projection 143 or three or more second cam projections 143 may be provided on the second circumference C2.

Also, for example, in the embodiment, the cam projections are provided on each of the two circumferences. However, the cam projections are provided on each of three or more circumferences.

Also, for example, in the embodiment, the cam member 140 is provided with cam projections, and the cam projections slide over the rotating portion 131 of the bracket 130, which is however non-limiting. The rotating portion 131 of the bracket 130 may be provided with cam projections, and the cam projections may slide over the cam member 140. That is, a portion constituting the cam member 140 and a portion constituting the rotating portion 131 of the bracket 130 may be provided in reverse.

Also, for example, in the embodiment, the rotating portion 131 of the bracket 130 is sandwiched between the two cam members 140A and 140B, which is however non-limiting. Only one of the cam members 140 may be provided.

Also, for example, in the embodiment, the opening and closing mechanism 100 is used for opening and closing the monitor 12, which is however non-limiting. The opening and closing mechanism 100 may be used for opening and closing anything other than the monitor 12.

Also, for example, in the embodiment, the three click positions are provided, which is however non-limiting. Two or less click positions or four or more click positions may be provided. Alternatively, no click positions may be provided.

The present international application claims priority to Japanese Patent Application No. 2021-203131, filed Dec. 15, 2021, the contents of which are incorporated herein by reference in their entirety.

DESCRIPTION OF THE REFERENCE NUMERAL 10 display device
12 monitor
12A display face
20 ceiling face
22 installation face
100 opening and closing mechanism
110 stand
111 horizontal wall portion
111A through-hole
112 vertical wall portion
112A fitting hole
120 shaft
121 fitted portion
122 flange
123 fitted portion
130 bracket (opening and closing member)
131 rotating portion
131A opening
131B first sliding face
131C second sliding face
131D suppression portion
131Da inner wall face
131E avoidance portion
131Ea inner wall face
131F avoidance portion
131Fa end portion
131G1 first fitting portion
131G2 second fitting portion
131G3 third fitting portion
131H sliding portion
131I sliding portion
131J sliding portion
131K sliding portion
132 retaining portion
132A vertical wall portion
132B horizontal wall portion
140 cam member
140A first cam member
140Aa surface
140B second cam member
140Ba surface
141 opening
142 first cam projection
142A side-wall portion
143 second cam projection
150 pressing plate
151 fitting hole
160 disc spring (elastic member)
161 opening
C1 first circumference
C2 second circumference
P1 closed position
P2 torque-generating position
P3, P4, P5 click position
P6 opened position
R1 sliding torque range
AX rotation axis

The invention claimed is:

1. An opening and closing mechanism, comprising:
an opening and closing member including a rotating portion on a rotation axis thereof; and
a cam member disposed to face the rotating portion of the opening and closing member on the rotation axis, the cam member being configured to apply a load to the rotating portion,
wherein one of the cam member or the rotating portion includes
at least one first cam projection provided on a first circumference having the rotation axis as a center thereof, and
at least one second cam projection provided on a second circumference having the rotation axis as a center thereof, with a radius of the second circumference being larger than a radius of the first circumference,
the other member of the cam member and the rotating portion includes
a sliding face configured to alternately slide over either the first cam projection or the second cam projection, with no simultaneous contact between the sliding face and both cam projections, and
the opening and closing mechanism is configured to operate:
in a first angle range in which the first cam projection slides over the sliding face and the second cam projection is completely disengaged from the sliding face, and
in a second angle range in which the second cam projection slides over the sliding face and the first cam projection is completely disengaged from the sliding face.

2. The opening and closing mechanism according to claim 1, wherein:
the cam member includes:
the first cam projection; and
the second cam projection, and
the rotating portion has the sliding face.

3. The opening and closing mechanism according to claim 1,
wherein:
the first cam projection and the second cam projection are different in height from each other; and
the opening and closing mechanism is configured to operate in a third angle range where a higher cam projection of the first cam projection and the second cam projection slides over the sliding face, while a lower cam projection of the first cam projection and the second cam projection does not slide over the sliding face.

4. The opening and closing mechanism according to claim 1, wherein:
the other member includes
an avoidance on the first circumference, the avoidance being formed as a cutout or recessed shape and configured to prevent the other member from contacting the first cam projection.

5. The opening and closing mechanism according to claim 1, wherein:
the other member includes
an avoidance on the second circumference, the avoidance being formed as a cutout or recessed shape and configured to prevent the other member from contacting the second cam projection.

6. The opening and closing mechanism according to claim 1, wherein:
the other member includes
a plurality of fitting portions each formed as a hole or in a recessed shape, the plurality of fitting portions being capable of fixing an opening or closing angle of the opening and closing member at a plurality of stages by receiving the first cam projection or the second cam projection in the first angle range or the second angle range.

7. The opening and closing mechanism according to claim 1, wherein:
the cam member is provided so as to be movable in a direction of the rotation axis.

8. The opening and closing mechanism according to claim 7, further comprising:
an elastic member disposed on the rotation axis, the elastic member being configured to press the cam member toward the rotating portion of the opening and closing member.

9. The opening and closing mechanism according to claim 1, wherein:
the opening and closing mechanism includes a pair of the cam members, the rotating portion of the opening and closing member being between the pair of the cam members, and the cam members having symmetrical shapes to each other.

10. The opening and closing mechanism according to claim 1, wherein:
the opening and closing member is configured to retain a monitor and open and close with the monitor.

11. The opening and closing mechanism according to claim 2, wherein:
the first cam projection and the second cam projection are different in height from each other; and
the opening and closing mechanism is configured to operate in a third angle range where a higher cam projection of the first cam projection and the second projection cam slides over the sliding face, while a lower cam projection of the first cam projection and the second cam projection does not slide over the sliding face.

12. The opening and closing mechanism according to claim 2, wherein:
the other member includes
an avoidance on the first circumference, the avoidance being formed as a cutout or recessed shape and configured to prevent the other member from contacting the first cam projection.

13. The opening and closing mechanism according to claim 2, wherein:
the other member includes
an avoidance on the second circumference, the avoidance being formed as a cutout or recessed shape and configured to prevent the other member from contacting the second cam projection.

14. The opening and closing mechanism according to claim 2, wherein:
the other member includes
a plurality of fitting portions each formed as a hole or in a recessed shape, the plurality of fitting portions being capable of fixing an opening or closing angle of the opening and closing member at a plurality of stages by receiving the first cam projection or the second cam projection in the first angle range or the second angle range.

15. The opening and closing mechanism according to claim 2, wherein:
the cam member is provided so as to be movable in a direction of the rotation axis.

16. The opening and closing mechanism according to claim 15, further comprising:
an elastic member disposed on the rotation axis, the elastic member being configured to press the cam member toward the rotating portion of the opening and closing member.

17. The opening and closing mechanism according to claim 2, wherein:
the opening and closing mechanism includes a pair of the cam members, the rotating portion of the opening and closing member being between the pair of the cam members, and the cam members having symmetrical shapes to each other.

18. The opening and closing mechanism according to claim 2, wherein:
the opening and closing member is configured to retain a monitor and open and close with the monitor.

\* \* \* \* \*